(12) United States Patent
Yu et al.

(10) Patent No.: US 10,870,257 B2
(45) Date of Patent: Dec. 22, 2020

(54) PROCESS FOR PREPARING FOAMED ARTICLES MADE FROM ETHYLENE/α-OLEFIN INTERPOLYMERS

(71) Applicant: DOW GLOBAL TECHNOLOGIES LLC, Midland, MI (US)

(72) Inventors: Haiyang Yu, Shanghai (CN); Xiaochun Liu, Shanghai (CN); Yongchun Chen, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 166 days.

(21) Appl. No.: 16/085,261

(22) PCT Filed: Mar. 14, 2016

(86) PCT No.: PCT/CN2016/076245
§ 371 (c)(1),
(2) Date: Sep. 14, 2018

(87) PCT Pub. No.: WO2017/156674
PCT Pub. Date: Sep. 21, 2017

(65) Prior Publication Data
US 2020/0164615 A1    May 28, 2020

(51) Int. Cl.
*B32B 5/20*        (2006.01)
*B32B 27/18*       (2006.01)
(Continued)

(52) U.S. Cl.
CPC ............... *B32B 5/20* (2013.01); *B32B 27/18* (2013.01); *C08L 25/08* (2013.01); *C08L 27/04* (2013.01); *C08L 33/08* (2013.01); *C09J 175/04* (2013.01); *B32B 2250/22* (2013.01); *B32B 2266/025* (2013.01); *B32B 2323/00* (2013.01); *B32B 2437/00* (2013.01); *C09J 5/02* (2013.01)

(58) Field of Classification Search
None
See application file for complete search history.

(56) References Cited

U.S. PATENT DOCUMENTS 6,841,583 B2   1/2005   Sueda et al.
6,916,508 B2   7/2005   Adachi et al.
(Continued)

FOREIGN PATENT DOCUMENTS

CA   2544102   10/2006
EP   1234517   8/2002
(Continued)

OTHER PUBLICATIONS

Matuszczyk, J, Oct. 14, 2013, machine translation of PL224694 (equivalent to PL 398812) (Year: 2013).*
(Continued)

*Primary Examiner* — Chinessa T. Golden
(74) *Attorney, Agent, or Firm* — Cheney Huang

(57) ABSTRACT

The present disclosure is directed to a process for preparing foamed articles comprising at least one ethylene/α-olefin interpolymer and use of the foamed articles in various applications, such as footwear applications. The ethylene/α-olefin interpolymers of the present disclosure are multi-block copolymers comprising at least one soft block and at least one hard block.

9 Claims, 4 Drawing Sheets

(51) Int. Cl.
*C08L 25/08* (2006.01)
*C08L 27/04* (2006.01)
*C08L 33/08* (2006.01)
*C09J 175/04* (2006.01)
*C09J 5/02* (2006.01)

(56) References Cited

U.S. PATENT DOCUMENTS

| | | |
|---|---|---|
| 7,666,918 B2 | 2/2010 | Prieto et al. |
| 7,763,692 B2 | 7/2010 | Tamai et al. |
| 2002/0183408 A1 | 12/2002 | Sueda et al. |
| 2006/0233959 A1 | 10/2006 | Strickland |
| 2008/0274296 A1 | 11/2008 | Scott |
| 2011/0294942 A1* | 12/2011 | Duffy .................. C09D 5/00 524/502 |
| 2012/0046373 A1 | 2/2012 | Low et al. |
| 2013/0053465 A1* | 2/2013 | Manami ................ C08J 9/06 521/144 |
| 2013/0273359 A1 | 10/2013 | Arndt et al. |
| 2013/0273375 A1 | 10/2013 | Achten et al. |
| 2014/0290096 A1 | 10/2014 | Wilson, III |
| 2015/0315400 A1* | 11/2015 | Yano .................. C09J 123/26 524/113 |

FOREIGN PATENT DOCUMENTS

| | | |
|---|---|---|
| EP | 1820821 A1 | 8/2007 |
| PL | 398812 A1 * | 10/2013 |
| WO | 2005058990 | 6/2005 |
| WO | 2006113000 A2 | 10/2006 |
| WO | 2010098932 | 9/2010 |
| WO | 2014035467 A1 | 3/2014 |
| WO | 2016004618 | 1/2016 |
| WO | 2016004898 | 1/2016 |

OTHER PUBLICATIONS

PCT/CN2016/076245, International Preliminary Report on Patentability dated Sep. 18, 2018.
PCT/CN2016/076245, International Search Report and Written Opinion dated Dec. 21, 2016.

* cited by examiner

FIG. 1

| POE or OBC foam with skin on | MEK Clean Surface Without preheat | Heating Oven Temp: 70C for 3' | | |
|---|---|---|---|---|
| Apply UV primer Primer by cotton | Heating Oven Temp: 70C for 3' | UVA light, 60S Energy varied | Pre-treated POE foam | |
| Two pre-treated POE foam | Adhesive PU | Heating Oven Temp: 70C for 3' | Attaching in Oven | Compression 3kgf/cm² for 45S |
| | | Chiling Refrigerator | Conditioning 24 hour | 180 deg peel test |

PROCESS FOR PREPARING FOAMED ARTICLES MADE FROM ETHYLENE/α-OLEFIN INTERPOLYMERS

FIELD

The present disclosure relates to a process for preparing foamed articles comprising at least one ethylene/α-olefin interpolymer and use of the foamed articles in various applications, such as footwear applications.

INTRODUCTION

Ethylene vinyl acetate copolymers (EVA), olefin-based polymers (e.g., POE (polyolefin elastomers) and OBC (olefin block copolymers)), and blends thereof are used to fabricate foam products in footwear applications, such as shoe soles. Currently, the materials used in footwear midsoles are dominated by EVA. However, olefin-based polymers can be produced with specially designed molecular weight and molecular weight distribution. This process affords some very unique characteristics to the products, and these polymers are finding many applications in footwear. Olefin-based polymers have several advantages, compared with EVA, such as being light weight (due to the comparatively low polymer density) which is a general trend in sole design. In addition, the comparatively high melting point of OBC also brings additional advantages such as low shrinkage, low compression set, and improved dynamic fatigue resistance at elevated temperatures, which are also very important in footwear production and use. Currently, OBC has been commercialized in several footwear applications, and it is expected that there will be more applications in the future.

The non-polar molecular property of olefin-based polymers makes them difficult to be bonded, painted, and printed, due to the low surface energy of the polyolefins. For example, in the footwear assembling process, the midsole is bonded to the outsole, which is usually made from vulcanized rubber or thermoplastic polyurethane (TPU), and to the shoe upper, which is made from natural/artificial leather. The existing maximum total olefin-based polymer loading in the midsole formulation cannot exceed 30% (the balance is EVA) due to adhesion issues of higher olefin-based polymer content compositions. Certain approaches currently exist to enhance the surface energy and, thus, improve the aforementioned issues of olefin-based materials, such as bulk modification or surface treatment. Surface treatment includes flame treatment, plasma treatment, acid treatment, or use of adhesion promoters (i.e., primers). Primer technology (e.g., ultraviolet curable primers) are widely used in the current footwear industry due to ease of application and economics. However, it has been found that olefin-based foams (e.g., high density OBC based foams) are still difficult to be bonded. Indeed, while use of the novel primers disclosed in WO 2016/004618 A1 and WO 2016/004898 A1 provides for better bonding performance compared to use of the primers of the prior art, there is still a need to improve the bonding performance of olefin-based foams (e.g., high density OBC based foams) such that a target peel strength of over 3 N/mm can be met, where the foams maintain their original shape/dimensions without any shrinkage or warpage.

SUMMARY

Embodiments relate to a process for preparing a foamed article comprising an adhesive layer bonded to at least one foam layer, said process comprising the steps of: i) preparing the foam layer; ii) applying a primer to the foam layer; iii) irradiating the foam layer with an ultraviolet energy of greater than 0.7 J/cm$^2$; and iv) applying the adhesive layer to the foam layer, wherein the foam layer comprises greater than 50 weight percent of an ethylene/α-olefin interpolymer, and wherein the primer comprises:

A) one or more monomers and/or oligomers selected from the group consisting of

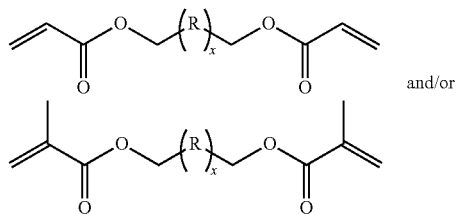

and/or wherein each R is independently selected from the group consisting of the following: substituted or unsubstituted hydrocarbylenes, and substituted or unsubstituted heterohydrocarbylenes, each of the hydrocarbylenes and heterohydrocarbylenes having between 4 and 40 carbon atoms and x is any integer equal to or greater than 1;

B) at least one chlorinated olefin-based polymer and/or at least one functionalized chlorinated olefin-based polymer;

C) at least one styrene-based block copolymer or derivative thereof; and

D) at least one photoinitiator.

BRIEF DESCRIPTION OF THE FIGURES

FIG. 1 illustrates an exemplary, non-limiting foam bonding process according to an embodiment of the present disclosure.

DETAILED DESCRIPTION

General Definitions

Figure 2:
FIG. 2 exhibits an exemplary, non-limiting UV curing chamber for use in an embodiment of the present disclosure.

"Polymer" refers to a polymeric compound prepared by polymerizing monomers, whether of the same or a different type. The generic term "polymer" embraces the terms "homopolymer," "copolymer," "terpolymer," as well as "interpolymer."

The term "homopolymer" refers to polymers prepared from only one type of monomer, with the understanding that trace amounts of impurities can be incorporated into the polymer structure. Trace amounts of impurities (e.g., catalyst residues) may be incorporated into and/or within the polymer.

"Interpolymer" refers to a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "olefin-based polymer" refers to a polymer that comprises a majority amount of polymerized olefin monomer, for example ethylene or propylene (based on weight of the polymer) and, optionally, may contain at least one comonomer.

The term "ethylene-based polymer" refers to a polymer that comprises a majority amount of polymerized ethylene monomer (based on weight of the polymer) and, optionally, may contain at least one comonomer.

The term "propylene-based polymer" refers to a polymer that comprises a majority amount of polymerized propylene monomer (based on weight of the polymer) and, optionally, may comprise at least one comonomer.

The terms "ethylene/α-olefin interpolymer" and "ethylene/α-olefin multi-block interpolymer," as used herein, refer to an interpolymer that comprises a majority amount of polymerized ethylene monomer (based on weight of the interpolymer) and at least one α-olefin.

The terms "ethylene/α-olefin copolymer" and "ethylene/α-olefin multi-block copolymer," as used herein, refer to a copolymer that comprises a majority amount of polymerized ethylene monomer (based on weight of the copolymer), and an α-olefin, as the only two monomer types.

The terms "chlorinated olefin-based polymer," "functionalized, chlorinated olefin based polymer," "hydrocarbylene," "substituted hydrocarbylene," "heterhydrocarbylene," "styrenic based block copolymer," "photoinitatiors," and "non-aromatic and non-chlorinated solvents" are described and defined in WO 2016/004618 A1 and WO 2016/004898 A1, which are incorporated herein in their entirety.

Ethylene/α-Olefin Interpolymers

The term "olefin block copolymer" or "OBC" means (and is interchangeable with) an ethylene/α-olefin interpolymer and includes ethylene and one or more copolymerizable α-olefin comonomer in polymerized form, characterized by multiple blocks or segments of two or more polymerized monomer units differing in chemical or physical properties. When referring to amounts of "ethylene" or "comonomer" in the interpolymer, it is understood that this means polymerized units thereof. In some embodiments, the ethylene/α-olefin interpolymer is an ethylene/α-olefin multi-block interpolymer. In further embodiments, the ethylene/α-olefin interpolymer is an ethylene/α-olefin multi-block copolymer that can be represented by the following formula:

$$(AB)_n,$$

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows. AAA-AA-BBB-BB.

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. In some embodiments, the olefin block copolymer may comprise 50 mol % to 90 mol % ethylene, preferably 60 mol % to 85 mol %, more preferably 65 mol % to 80 mol %. For many ethylene/octene block copolymers, the preferred composition comprises an ethylene content greater than 80 mole percent of the whole polymer and an octene content of from 10 to 15, preferably from 15 to 20 mole percent of the whole polymer.

The olefin block copolymer includes various amounts of "hard" and "soft" segments. "Hard" segments are blocks of polymerized units in which ethylene is present in an amount greater than 95 weight percent, or greater than 98 weight percent based on the weight of the polymer, up to 100 weight percent. In other words, the comonomer content (content of monomers other than ethylene) in the hard segments is less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an OBC from 1 weight percent to 99 weight percent of the total weight of the OBC, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the OBC. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-polymers," filed on Mar. 15, 2006, in the name of Cohn L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in Column 57 to Column 63 of U.S. Pat. No. 7,608,668.

The olefin block copolymer is a multi-block or segmented polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

When produced in a continuous process, embodiments of the OBC may possess a PDI ranging from 1.7 to 8; or from 1.7 to 3.5; or from 1.7 to 2.5; and from 1.8 to 2.5; or from 1.8 to 2.1. When produced in a batch or semi-batch process, the OBC possesses PDI from 1.0 to 3.5, or from 1.3 to 3, or from 1.4 to 2.5, or from 1.4 to 2.

Because the respective distinguishable segments or blocks formed from two or more monomers are joined into single polymer chains, the polymer cannot be completely fractionated using standard selective extraction techniques. For example, polymers containing regions that are relatively crystalline (high density segments) and regions that are relatively amorphous (lower density segments) cannot be selectively extracted or fractionated using differing solvents. In an embodiment, the quantity of extractable polymer using either a dialkyl ether or an alkane solvent is less than 10, or less than 7, or less than 5, or less than 2, percent of the total polymer weight.

In addition, the OBC disclosed herein possesses a PDI fitting a Schultz-Flory distribution rather than a Poisson distribution. The present OBC is produced by the polymerization process described in U.S. Pat. Nos. 7,858,706 and 7,608,668 which results in a product having both a polydisperse block distribution as well as a polydisperse distribution of block sizes. This results in the formation of OBC product having distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238. In an embodiment, the present olefin block copolymer possesses a most probable distribution of block lengths. In an embodiment, the olefin block copolymer is defined as having:

(A) Mw/Mn from 1.7 to 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ and/or}$$

(B) Mw/Mn from 1.7 to 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299 \Delta H + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer (E) has a storage modulus at 25° C., G' (25° C.), and a storage modulus at 100° C., G'(100° C.), wherein the ratio of G' (25° C.) to G' (100° C.) is in the range of 1:1 to 9:1.

The olefin block copolymer may also have:

(F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) average block index greater than zero and up to 1.0 and a molecular weight distribution, Mw/Mn greater than 1.3. It is understood that the olefin block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

The ethylene/α-olefin multi-block interpolymer, and further copolymer, may comprise any one of properties (A) through (G), or may comprises a combination of two or more of (A) through (G).

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decease, 1-dodecene, 1-tetradecene, 1-hexadecene, 1-octadecene and 1-eicosene; cyclo-olefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene. Preferred α-olefins include, but are not limited to, C3-C20 α-olefins, and preferably C3-C10 α-olefins. More preferred α-olefins include propylene, 1-butene, 1-pentene, 1-hexene, 1-heptene and 1-octene, and more preferably include propylene, 1-butene, 1-hexene and 1-octene.

The olefin block copolymers can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. Nos. 7,608,668; 7,893,166; and 7,947,793.

In one embodiment, the ethylene/α-olefin multi-block interpolymer, and further copolymer, has a density greater than 0.850 g/cc, further greater than 0.860 g/cc, and further greater than 0.870 g/cc. Density is measured by the procedure of ASTM D-792-08.

In one embodiment, the ethylene/α-olefin multi-block interpolymer, and further copolymer, has a melting point of greater than 90° C., further greater than 100° C. The melting point is measured by Differential Scanning calorimetry (DSC) method described in U.S. Publication 2006/0199930 (WO 2005/090427), incorporated herein by reference.

In one embodiment, the ethylene/α-olefin multi-block interpolymer, and further copolymer, has a melt index (I2) greater than, or equal to, 0.1 g/10 min, further greater than, or equal to, 0.5 g/10 min, and further greater than, or equal to, 1 g/10 min, as determined using ASTM D-1238 (190° C., 2.16 kg load).

In one embodiment, the ethylene/α-olefin multi-block interpolymer, and further copolymer, has a melt index (I2) less than, or equal to, 50 g/10 min, further less than, or equal to, 20 g/10 min, and further less than, or equal to, 10 g/10 min, as determined using ASTM D-1238 (190° C., 2.16 kg load).

An ethylene/α-olefin multi-block interpolymer may comprise a combination of two or more embodiments as described herein.

An ethylene/α-olefin multi-block copolymer may comprise a combination of two or more embodiments as described herein.

Preparation of Foam Layers

In certain embodiments, the process of the present disclosure includes the step of i) preparing the foam layer. "Preparing the foam layer" includes the following disclosures, as well as the methods and disclosures of U.S. Pat. No. 7,666,918 B2, which is incorporated by reference herein in its entirety.

The foam layers or foams disclosed herein can be prepared from a foamable composition comprising at least one blowing agent, at least one cross-linking agent and at least one ethylene/α-olefin interpolymer disclosed herein. Optionally, the foamable composition may further comprise at least a second polymer component, at least one other additive or a combination thereof. Non-limiting examples of suitable other additives include grafting initiators, cross-linking catalysts, blowing agent activators (e.g., zinc oxide, zinc stearate and the like), coagents (e.g., triallyl cyanurate), plasticizers, colorants or pigments, stability control agents, nucleating agents, fillers, antioxidants, acid scavengers, ultraviolet stabilizers, flame retardants, lubricants, processing aids, extrusion aids, and combinations thereof.

In certain embodiments, the ethylene/α-olefin interpolymer comprises the majority phase of the foamable composition, e.g., at least 50 wt % of the foamable composition.

The foams disclosed herein may take any physical forms known in the art, such as sphere, cylinder, disk, cube, prism, sheet, plank, foam slab stock or irregular shapes. Further, they can be injection molded articles, compression molded articles, or extruded articles. Other useful forms are expandable or foamable particles, moldable foam particles, or beads, and articles formed by expansion and/or coalescing and welding of those particles.

In some footwear applications such as inner soles, midsoles, outer soles, unisoles, and sole inserts, the foams disclosed herein can be substantially cross-linked. A foam is substantially cross-linked when the foam contains more than 5% of gel per ASTM D-2765-84 Method A. In some embodiments, the foam disclosed herein contains more than about 5% of gel, more than about 10% of gel, more than about 15% of gel, more than about 20% of gel, more than about 25% of gel, more than about 30% of gel, more than about 35% of gel, or more than about 40% of gel per ASTM D-2765-84 Method A. In other embodiments, the foam disclosed herein contains less than about 95% of gel. In further embodiments, the foam disclosed herein contains less than about 85% of gel. In further embodiments, the foam disclosed herein contains less than about 75% of gel.

In certain embodiments, the foam compositions of the present disclosure have a density, as measured by ASTM D-792, of from 0.10 g/cc to 0.50 g/cc.

The foams or foamable compositions disclosed herein can be either closed-celled or open-celled. Disclosed herein, a foam is a closed cell foam when the foam contains 80% or more closed cells or less than 20% open cells according to ASTM D2856-A. In some embodiments, the foams disclosed herein can have less than about 1% open cells, less than about 10% open cells, less than about 20% open cells, less than about 30% open cells, less than about 40% open cells, less than about 50% open cells, less than about 60% open cells, less than about 10% open cells, less than about 70% open cells, less than about 80% open cells or less than about 90% open cells. In other embodiments, the foams disclosed herein can have between about 10% and about 90% open cells, between about 10% and about 50% open cells, between about 50% and about 90% open cells, or between about 10% and about 30% open cells.

In some embodiments, the foamable composition comprises the ethylene/α-olefin interpolymer disclosed herein. In other embodiments, the foamable composition comprises a polymer blend (hereinafter "polymer blend") comprising the ethylene/α-olefin interpolymer and a second polymer component. Some non-limiting examples of the second polymer component include ethylene/α-olefin random copolymer, EVA, polyolefins (e.g., polyethylene and polypropylene), foamable polymers (e.g., polystyrene, ABS, SBS and the like) and combinations thereof. In some embodiments, the second polymer component is ethylene/α-olefin random copolymer, EVA, polyethylene, polypropylene, polystyrene, ABS, SBS or a combination thereof. The second polymer component may be blended with the ethylene/α-olefin interpolymer before it is added to the foamable composition. In some embodiments, the second polymer component is added directly to the foamable composition without pre-blending with the ethylene/α-olefin interpolymer.

The weight ratio of the ethylene/α-olefin interpolymer to the second polymer component in the polymer blend can be between about 1:99 and about 99:1, between about 1:50 and about 50:1, between about 1:25 and about 25:1, between about 1:10 and about 10:1, between about 1:9 and about 9:1, between about 1:8 and about 8:1, between about 1:7 and about 7:1, between about 1:6 and about 6:1, between about 1:5 and about 5:1, between about 1:4 and about 4:1, between about 1:3 and about 3:1, between about 1:2 and about 2:1, between about 3:7 and about 7:3 or between about 2:3 and about 3:2.

In some embodiments, the second polymer component is a polyolefin. Any polyolefin that is partially or totally compatible with the ethylene/α-olefin interpolymer may be used. Non-limiting examples of suitable polyolefins include polyethylenes; polypropylenes; polybutylenes (e.g., polybutene-1); polypentene-1; polyhexene-1; polyoctene-1; polydecene-1; poly-3-methylbutene-1; poly-4-methylpentene-1; polyisoprene; polybutadiene; poly-1,5-hexadiene; interpolymers derived from olefins; interpolymers derived from olefins and other polymers such as polyvinyl chloride, polystyrene, polyurethane, and the like; and mixtures thereof. In some embodiments, the polyolefin is a homopolymer such as polyethylene, polypropylene, polybutylene, polypentene-1, poly-3-methylbutene-1, poly-4-methylpentene-1, polyisoprene, polybutadiene, poly-1,5-hexadiene, polyhexene-1, polyoctene-1 and polydecene-1.

Some non-limiting examples of suitable polyethylenes include ultra low density polyethylene (ULDPE), linear low density polyethylene (LLDPE), low density polyethylene (LDPE), medium density polyethylene (MDPE), high density polyethylene (HDPE), high molecular weight high density polyethylene (HMW-HDPE), ultra high molecular weight polyethylene (UHMW-PE) and combinations thereof. Some non-limiting examples of polypropylenes include low density polypropylene (LDPP), high density polypropylene (HDPP), high-melt strength polypropylene (HMS-PP) and combination thereof. In some embodiments, the second polymer component is or comprises high-melt-strength polypropylene (HMS-PP), low density polyethylene (LDPE) or a combination thereof.

The blowing agents suitable for making the foams disclosed herein can include, but are not limited to, inorganic blowing agents, organic blowing agents, chemical blowing agents and combinations thereof. Some blowing agents are disclosed in Sendijarevic et al., "Polymeric Foams And Foam Technology," Hanser Gardner Publications, Cincinnati, Ohio, 2nd edition, Chapter 18, pages 505-547 (2004), which is incorporated herein by reference.

Non-limiting examples of suitable inorganic blowing agents include carbon dioxide, nitrogen, argon, water, air, nitrogen, and helium. Non-limiting examples of suitable organic blowing agents include aliphatic hydrocarbons having 1-6 carbon atoms, aliphatic alcohols having 1-3 carbon atoms, and fully and partially halogenated aliphatic hydrocarbons having 1-4 carbon atoms. Non-limiting examples of suitable aliphatic hydrocarbons include methane, ethane, propane, n-butane, isobutane, n-pentane, isopentane, neopentane, and the like. Non-limiting examples of suitable aliphatic alcohols include methanol, ethanol, n-propanol, and isopropanol. Non-limiting examples of suitable fully and partially halogenated aliphatic hydrocarbons include fluorocarbons, chlorocarbons, and chlorofluorocarbons. Non-limiting examples of suitable chemical blowing agents include azodicarbonamide, azodiisobutyro-nitrile, benezenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine.

The amount of the blowing agent in the foamable composition disclosed herein may be from about 0.1 to about 20 wt %, from about 0.1 to about 10 wt %, or from about 0.1 to about 5 wt % of the foamable composition.

The foams disclosed herein can be perforated to enhance or accelerate permeation of the blowing agent from the foam cells and/or air into the foam cells. The teachings of foam perforation are disclosed in U.S. Pat. Nos. 5,424,016 and 5,585,058, both of which are incorporated herein by reference.

The foamable compositions disclosed herein comprise a cross-linking agent. Any cross-linking agent that can cross-link the ethylene/α-olefin interpolymer or the polymer blend disclosed herein can be used. The cross-linking agent can be incorporated into the ethylene/α-olefin interpolymer or the polymer blend in the same manner as the blowing agent. The amount of the cross-linking agent in the foamable compositions or foams can be from about greater than 0 to about 10 wt %, from about 0.1 to about 7.5 wt %, or from about 1 to about 5 wt % of the foamable composition.

When a cross-linking agent is used, the cross-linking of the foams can be induced by activating the cross-linking agent in the foamable composition. The cross-linking agent can be activated by exposing it to a temperature above its decomposition temperature. Alternatively, the cross-linking agent can be activated by exposing it to a radiation that causes the generation of free radicals from the cross-linking agent. Such radiation can include, for example, radio frequency activation where radio frequency interacts with an additive that causes the material to heat quickly and can initiate the cross-linking reaction. Similarly, the foaming or expansion of the foams disclosed herein can be induced by activating the blowing agent in the foamable composition. In some embodiments, the blowing agent is activated by exposing it to a temperature above its activation temperature. Generally, the activations of the cross-linking and foaming can occur either simultaneously or sequentially. In some embodiments, the activations occur simultaneously. In other embodiments, the activation of the cross-linking occurs first and the activation of the foaming occurs next. In further embodiments, the activation of the foaming occurs first and the activation of the cross-linking occurs next.

Non-limiting examples of suitable cross-linking agents include peroxides, phenols, azides, aldehyde-amine reaction products, substituted ureas, substituted guanidines; substituted xanthates; substituted dithiocarbamates; sulfur-containing compounds, such as thiazoles, sulfenamides, thiuramidisulfides, paraquinonedioxime, dibenzoparaquinonedioxime, sulfur; imidazoles; silanes and combinations thereof.

In some embodiments, the cross-linking agents are silanes. Any silane that can effectively graft to and/or cross-link the ethylene/α-olefin interpolymer or the polymer blend disclosed herein can be used. Non-limiting examples of suitable silane cross-linking agents include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group such as a hydrocarbyloxy, hydrocarbonyloxy, and hydrocarbylamino group. Non-limiting examples of suitable hydrolyzable groups include methoxy, ethoxy, formyloxy, acetoxy, proprionyloxy, alkyl and arylamino groups. In other embodiments, the silanes are the unsaturated alkoxy silanes which can be grafted onto the interpolymer. Some of these silanes and their preparation methods are more fully described in U.S. Pat. No. 5,266,627, which is incorporated herein by reference. In further embodiments, the silane cross-linking agents are vinyltrimethoxysilane, vinyltriethoxysilane, vinyltris(2-methoxyethoxy)silane, vinyltriacetoxysilane, vinylmethyldimethoxysilane, 3-methacryloyloxypropyltrimethoxysilane, and combinations thereof.

Optionally, the foamable composition disclosed herein may comprise a grafting initiator. Those skilled in the art will be readily able to select the amount of the grafting initiator based on the characteristics of the ethylene/α-olefin interpolymer or the polymer blend, such as molecular weight, molecular weight distribution, comonomer content, as well as the presence of cross-linking enhancing coagents, additives, and the like.

Optionally, the foamable composition disclosed herein may comprise a catalyst. Any cross-linking catalyst that can promote the cross-linking of the ethylene/α-olefin interpolymer or the polymer blend can be used. Non-limiting examples of suitable catalysts include organic bases, carboxylic acids, and organometallic compounds. In some embodiments, the catalyst includes organic titanates and complexes or carboxylates of lead, cobalt, iron, nickel, zinc and tin. In other embodiments, the catalyst is or comprises dibutyltin dilaurate, dioctyltin maleate, dibutyltin diacetate, dibutyltin dioctanoate, stannous acetate, stannous octanoate, lead naphthenate, zinc caprylate, cobalt naphthenate or a combination thereof. In further embodiments, the catalyst is or comprises a tin carboxylate such as dibutyltin dilaurate and dioctyltin maleate.

Alternatively, the cross-linking of the foams or foamable compositions disclosed herein can be effected by using radiation. Non-limiting examples of suitable radiation include electron beam or beta ray, gamma rays, X-rays, or neutron rays. Radiation is believed to activate the cross-linking by generating radicals in the polymer which may subsequently combine and cross-link. Additional teachings concerning radiation cross-linking are disclosed in C. P. Park, supra, pages 198-204, which is incorporated herein by reference. In some embodiments, the foam or foamable composition is not cross-linked by radiation.

Radiation dosage generally depends upon many factors. Those skilled in the art will be readily able to select suitable radiation levels based on thickness and geometry of the article to be irradiated, as well as the characteristics of the ethylene/α-olefin interpolymer or the polymer blend, such as molecular weight, molecular weight distribution, comonomer content, the presence of cross-linking enhancing coagents, additives (e.g., oil), and the like. In general, the dosage does not exceed what is required to effect the desired level of cross-linking. In some embodiments, the dosage causes more than 5% gel in the foam per ASTM D-2765-84 Method A.

In some embodiments, dual cure systems, which comprises at least two activation methods selected from cross-linking agents and radiation, can be effectively employed. For instance, it may be desirable to employ a peroxide cross-linking agent in conjunction with a silane cross-linking agent, a peroxide cross-linking agent in conjunction with radiation, a sulfur-containing cross-linking agent in conjunction with a silane cross-linking agent, or the like.

Those skilled in the art will be readily able to select the amount of cross-linking agent, based on the desired cross-linking level, the characteristics of the polymer such as molecular weight, molecular weight distribution, comonomer content, the presence of cross-linking enhancing coagents, other additives and the like. Since it is expressly contemplated that the ethylene/α-olefin interpolymer can be blended with other polymers such as EVA and polyolefins prior to cross-linking, those skilled in the art may use the disclosure herein as a reference point in optimizing the amount of the cross-linking agent for a particular polymer in question.

Optionally, the foams or foamable compositions disclosed herein can comprise at least one other additive. Any foam additive that can improve and/or control the processibility, appearance, physical, chemical, and/or mechanical properties of the foam structures or articles can be used. Non-limiting examples of suitable other additives include grafting initiators, cross-linking catalysts, blowing agent activators (e.g., zinc oxide, zinc stearate and the like), coagents (e.g., triallyl cyanurate), plasticizers, colorants or pigments, stability control agents, nucleating agents, fillers, antioxidants, acid scavengers, ultraviolet (UV) stabilizers, flame retardants, lubricants, processing aids, extrusion aids, and combinations thereof. The total amount of the other additives can range from about greater than 0 to about 80%, from about 0.001% to about 70%, from about 0.01% to about 60%, from about 0.1% to about 50%, from about 1% to about 40%, or from about 10% to about 50% of the total weight of the foam. Some suitable additives have been described in Zweifel Hans et al., "*Plastics Additives Handbook*," Hanser Gardner Publications, Cincinnati, Ohio, 5th edition (2001), which is incorporated herein by reference in its entirety.

The foams or foamable compositions disclosed herein may optionally comprise a stability control agent or gas permeation modifier. Any stability control agent that can enhance the dimensional stability of the foams can be used. Non-limiting examples of suitable stability control agents include amides and esters of $C_{10-24}$ fatty acids. Such agents are described in U.S. Pat. Nos. 3,644,230 and 4,214,054, both of which are incorporated herein by reference. In some embodiments, the stability control agents include stearyl stearamide, glycerol monostearate, glycerol monobehenate, sorbitol monostearate and combinations thereof. In general, the amount of the stability control agents is from about 0.1 to about 10 parts, from about 0.1 to about 5 parts, or from about 0.1 to about 3 parts by weight per hundred parts by weight of the polymer. In some embodiment, the stability control agent is glycerol monostearate.

The foams or foamable compositions disclosed herein may optionally comprise a nucleating agent. Any nucleating agent that can control the size of foam cells can be used. Non-limiting examples of suitable nucleating agents include inorganic substances such as calcium carbonate, talc, clay, titanium oxide, silica, barium sulfate, diatomaceous earth, citric acid, sodium bicarbonate, sodium carbonate, and combinations thereof. In some embodiments, the nucleating agent is a combination of citric acid and sodium bicarbonate or a combination of citric acid and sodium carbonate. In other embodiments, the nucleating agent is HYDROCEROL® CF 20 from Clariant Corporation, Charlotte, N.C. The amount of nucleating agent employed can range from 0.01 to 5 parts by weight per hundred parts by weight of the polymer.

In some embodiments, the foams or foamable compositions disclosed herein comprise an antioxidant. Any antioxidant that can prevent the oxidation of polymer components and organic additives in the foams can be added to the foams disclosed herein. Non-limiting examples of suitable antioxidants include aromatic or hindered amines such as alkyl diphenylamines, phenyl-α-naphthylamine, alkyl or aralkyl substituted phenyl-α-naphthylamine, alkylated p-phenylene diamines, tetramethyl-diaminodiphenylamine and the like; phenols such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, N.Y.); acryloyl modified phenols; octadecyl-3,5-di-t-butyl-4-hydroxycinnamate (e.g., IRGANOX™ 1076, commercially available from Ciba Geigy); phosphites and phosphorites; hydroxylamines; benzofuranone derivatives; and combinations thereof. Where used, the amount of the antioxidant in the foam can be from about greater than 0 to about 5 wt %, from about 0.0001 to about 2.5 wt %, from about 0.001 to about 1 wt %, or from about 0.001 to about 0.5 wt % of the total weight of the foam. Some antioxidants have been described in Zweifel Hans et al., "*Plastics Additives Handbook*," Hanser Gardner Publications, Cincinnati, Ohio, 5th edition, Chapter 1, pages 1-140 (2001), which is incorporated herein by reference.

In other embodiments, the foams or foamable compositions disclosed herein comprise a UV stabilizer. Any UV stabilizer that may prevent or reduce the degradation of the foams by UV irradiation can be added to the foams disclosed herein. Non-limiting examples of suitable UV stabilizers include benzophenones, benzotriazoles, aryl esters, oxanilides, acrylic esters, formamidines, carbon black, hindered amines, nickel quenchers, hindered amines, phenolic antioxidants, metallic salts, zinc compounds and combinations thereof. Where used, the amount of the UV stabilizer in the foam can be from about greater than 0 to about 5 wt %, from about 0.01 to about 3 wt %, from about 0.1 to about 2 wt %, or from about 0.1 to about 1 wt % of the total weight of the foam. Some UV stabilizers have been described in Zweifel Hans et al., "*Plastics Additives Handbook*," Hanser Gardner Publications, Cincinnati, Ohio, 5th edition, Chapter 2, pages 141-426 (2001), which is incorporated herein by reference.

In further embodiments, the foams or foamable compositions disclosed herein comprise a colorant or pigment. Any colorant or pigment that can change the look of the foams to human eyes can be added to the foams disclosed herein. Non-limiting examples of suitable colorants or pigments include inorganic pigments such as metal oxides such as iron oxide, zinc oxide, and titanium dioxide, mixed metal oxides, carbon black, organic pigments such as anthraquinones, anthanthrones, azo and monoazo compounds, arylamides, benzimidazolones, BONA lakes, diketopyrrolo-pyrroles, dioxazines, disazo compounds, diarylide compounds, flavanthrones, indanthrones, isoindolinones, isoindolines, metal complexes, monoazo salts, naphthols, b-naphthols, naphthol AS, naphthol lakes, perylenes, perinones, phthalocyanines, pyranthrones, quinacridones, and quinophthalones, and combinations thereof. Where used, the amount of the colorant or pigment in the foam can be from about greater than 0 to about 10 wt %, from about 0.1 to about 5 wt %, or from about 0.25 to about 2 wt % of the total weight of the foam. Some colorants have been described in Zweifel Hans et al., "*Plastics Additives Handbook*," Hanser Gardner Publications, Cincinnati, Ohio, 5th edition, Chapter 15, pages 813-882 (2001), which is incorporated herein by reference.

Optionally, the foams or foamable compositions disclosed herein can comprise a filler. Any filler which can be used to adjust, inter alia, volume, weight, costs, and/or technical performance can be added to the foams disclosed herein. Non-limiting examples of suitable fillers include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, titanates and combinations thereof. In some embodiments, the filler is barium sulfate, talc, calcium carbonate, silica, glass, glass fiber, alumina, titanium dioxide, or a mixture thereof. In other embodiments, the filler is talc, calcium carbonate, barium sulfate, glass fiber or a mixture thereof. Where used, the amount of the filler in the foam can be from about greater than 0 to about 80 wt %, from about 0.1 to about 60 wt %, from about 0.5 to about 40 wt %, from about 1 to about 30 wt %, or from about 10 to about 40 wt % of the total weight of the foam. Some fillers have been disclosed in U.S. Pat. No. 6,103,803 and Zweifel Hans et al., "*Plastics Additives Handbook*," Hanser Gardner Publications, Cincinnati, Ohio, 5th edition, Chapter 17, pages 901-948 (2001), both of which are incorporated herein by reference.

Optionally, the foams or foamable compositions disclosed herein can comprise a lubricant. Any lubricant that can be used, inter alia, to modify the rheology of the molten foamable compositions, to improve the surface finish of molded foamed articles, and/or to facilitate the dispersion of fillers or pigments can be added to the foams disclosed herein. Non-limiting examples of suitable lubricants include fatty alcohols and their dicarboxylic acid esters, fatty acid esters of short-chain alcohols, fatty acids, fatty acid amides, metal soaps, oligomeric fatty acid esters, fatty acid esters of long-chain alcohols, montan waxes, polyethylene waxes, polypropylene waxes, natural and synthetic paraffin waxes, fluoropolymers and combinations thereof. Where used, the amount of the lubricant in the foam can be from about greater than 0 to about 5 wt %, from about 0.1 to about 4 wt %, or from about 0.1 to about 3 wt % of the total weight of the foam. Some suitable lubricants have been disclosed in Zweifel Hans et al., "*Plastics Additives Handbook*," Hanser Gardner Publications, Cincinnati, Ohio, 5th edition, Chapter 5, pages 511-552 (2001), both of which are incorporated herein by reference.

Optionally, the foams or foamable compositions disclosed herein can comprise an antistatic agent. Any antistatic agent that can increase the conductivity of the foams and to prevent static charge accumulation can be added to the foams disclosed herein. Non-limiting examples of suitable antistatic agents include conductive fillers (e.g., carbon black, metal particles and other conductive particles), fatty acid esters (e.g., glycerol monostearate), ethoxylated alkylamines, diethanolamides, ethoxylated alcohols, alkylsulfonates, alkylphosphates, quaternary ammonium salts, alkylbetaines and combinations thereof. Where used, the amount of the antistatic agent in the foam can be from about greater than 0 to about 5 wt %, from about 0.01 to about 3 wt %, or from about 0.1 to about 2 wt % of the total weight of the foam. Some suitable antistatic agents have been disclosed in Zweifel Hans et al., "*Plastics Additives Handbook*," Hanser Gardner Publications, Cincinnati, Ohio, 5th edition, Chapter 10, pages 627-646 (2001), both of which are incorporated herein by reference.

The processes of making polyolefin foams are described in C. P. Park, "*Polyolefin Foam*", Chapter 9 of *Handbook of Polymer Foams and Technology*, edited by D. Klempner and K. C. Frisch, Hanser Publishers, Munich (1991), which is incorporated herein by reference.

The ingredients of the foamable composition can be mixed or blended in any suitable mixing or blending devices known to skilled artisans. The ingredients in the foamable composition can then be mixed at a temperature below the decomposition temperature of the blowing agent and the cross-linking agent to ensure that all ingredients are homogeneously mixed and remain intact. After the foamable composition is relatively homogeneously mixed, the composition is shaped and then exposed to conditions (e.g. heat, pressure, shear, etc.) over a sufficient period of time to activate the blowing agent and the cross-linking agent to make the foam.

In some embodiments, the ingredients of the foamable composition can be mixed and melt blended by any mixing or blending device known to a person of ordinary skill in the art. Non-limiting examples of suitable mixing or blending devices include extruders, mixers, blenders, mills, dispersers, homogenizers and the like. In other embodiments, the blowing agent is dry-blended with the ethylene/α-olefin interpolymer or the polymer blend before the foamable composition is heated to a molten form. In further embodiments, the blowing agent is added when the foamable composition is in a molten phase. In some embodiments, the foamable composition disclosed herein is extruded through a die where the cross-linking is activated. Next, the extruded foamable composition may be exposed to an elevated temperature to activate the blowing agent to form the foams.

The foams disclosed herein can be prepared by conventional extrusion foaming processes. The foam can generally be prepared by heating the ethylene/α-olefin interpolymer or the polymer blend to form a plasticized or melt polymer material, incorporating therein a blowing agent to form a foamable composition, and extruding the foamable composition through a die to form foam products. Prior to mixing with the blowing agent, the ethylene/α-olefin interpolymer can be heated to a temperature at or above its glass transition temperature or melting point. The blowing agent can be incorporated or mixed into the molten ethylene/α-olefin interpolymer by any means known in the art such as with an extruder, mixer, blender, and the like. The blowing agent can be mixed with the molten ethylene/α-olefin interpolymer at an elevated pressure sufficient to prevent substantial expansion of the molten ethylene/α-olefin interpolymer and to generally disperse the blowing agent homogeneously therein. Optionally, a nucleating agent can be blended in the interpolymer melt or dry blended with the ethylene/α-olefin interpolymer prior to plasticizing or melting. The foamable composition can be cooled to a lower temperature to optimize physical characteristics of the foam structure. The foamable composition can be then extruded or conveyed through a die of desired shape to a zone of reduced or lower pressure to form the foam structure. The zone of lower pressure can be at a pressure lower than that in which the foamable composition is maintained prior to extrusion through the die. The lower pressure can be super-atmospheric or sub-atmospheric (vacuum), but is preferably at an atmospheric level.

In some embodiments, the foams disclosed herein are formed in a coalesced strand form by extrusion of the ethylene/α-olefin interpolymer through a multi-orifice die. The orifices can be arranged so that contact between adjacent streams of the molten extrudate occurs during the foaming process and the contacting surfaces adhere to one another with sufficient adhesion to result in a unitary foam structure. The streams of the molten extrudate exiting the die can take the form of strands or profiles, which can desirably foam, coalesce, and adhere to one another to form a unitary structure. Desirably, the coalesced individual strands or profiles should remain adhered in a unitary structure to prevent strand delamination under stresses encountered in preparing, shaping, and using the foams. Apparatuses and methods for producing foam structures in coalesced strand form are disclosed in U.S. Pat. Nos. 3,573,152 and 4,824,720, both of which are incorporated herein by reference.

In other embodiments, the foams disclosed herein are formed by an accumulating extrusion process as seen in U.S. Pat. No. 4,323,528, which is incorporated by reference herein. In the accumulating extrusion process, low density foams having large lateral cross-sectional areas are prepared by: 1) forming under pressure a foamable composition of the ethylene/α-olefin interpolymer and a blowing agent at a temperature at which the viscosity of the foamable composition is sufficient to retain the blowing agent when the foamable composition is allowed to expand; 2) extruding the foamable composition into a holding zone maintained at a temperature and pressure which does not allow the foamable composition to foam, the holding zone having an outlet die defining an orifice opening into a zone of lower pressure at which the foamable composition foams, and an openable gate closing the die orifice; 3) periodically opening the gate; 4) substantially concurrently applying mechanical pressure by a movable ram on the foamable composition to eject it from the holding zone through the die orifice into the zone of lower pressure, at a rate greater than that at which substantial foaming in the die orifice occurs and less than that at which substantial irregularities in cross-sectional area or shape occurs; and 5) permitting the ejected foamable composition to expand unrestrained in at least one dimension to produce the foam structure.

In some embodiments, the foams disclosed herein are formed into non-crosslinked foam beads suitable for molding into articles. To make the foam beads, discrete ethylene/α-olefin interpolymer particles such as granulated ethylene/α-olefin interpolymer pellets are: (1) suspended in a liquid medium in which they are substantially insoluble such as water; (2) impregnated with a blowing agent by introducing the blowing agent into the liquid medium at an elevated pressure and temperature in an autoclave or other pressure vessel; and (3) rapidly discharged into the atmosphere or a region of reduced pressure to expand to form the foam beads. This process is well taught in U.S. Pat. Nos. 4,379,859 and 4,464,484, which are incorporated herein by reference.

In a derivative of the above process, styrene monomer can be impregnated into the suspended ethylene/α-olefin interpolymer pellets prior to impregnation with blowing agent to form a graft interpolymer with the ethylene/α-olefin interpolymer. The resulted graft interpolymer beads can be cooled and discharged from the vessel substantially unexpanded. The beads are then expanded and molded by the conventional expanded polystyrene bead molding process. The process of making some graft interpolymer beads is described in U.S. Pat. No. 4,168,353, which is incorporated herein by reference.

The foam beads can be molded into articles by any method known to a person of ordinary skill in the art. In some embodiments, the foam beads are charged to the mold, compressed by compressing the mold, and heated with a heat source such as steam to effect coalescing and welding of the foam beads to form the articles. In other embodiments, the foam beads are impregnated with air or other blowing agent at an elevated pressure and temperature prior to charging to the mold. In further embodiments, the foam beads are heated prior to charging to the mold. The beads can then be molded to blocks or shaped articles by a suitable molding method known in the art. Some of the methods are taught in U.S. Pat. Nos. 3,504,068 and 3,953,558 and in C. P. Park, supra, p. 191, pp. 197-198, and pp. 227-229, all of which are incorporated herein by reference.

In some embodiments, the foams disclosed herein can be prepared by either compression molding or injection molding. In other embodiments, the foams are prepared by compression molding at a temperature above the decomposition temperatures of the peroxide and the blowing agent which is followed by a post expansion when the mold open. In further embodiments, the foams are prepared by injection molding the ethylene/α-olefin interpolymer melts at temperatures below the decomposition temperatures of the peroxide and the blowing agent into molds at temperature above the decomposition temperatures of the peroxide and the blowing agent which is followed by a post expansion after opening the molds (from about 160 to about 190° C.).

In some embodiments, microcellular thermoplastic vulcanizate ("TPV") foams could be made using supercritical fluids (e.g., $CO_2$ or $N_2$). Such techniques are taught in U.S. Pat. Nos. 5,158,986; 5,160,674; 5,334,356; 5,866,053; 6,169,122; 6,284,810; and 6,294,115, which are incorporated by reference herein in their entirety. The methods disclosed therein can be used in embodiments of the invention with or without modifications. TPV compositions based on the inventive polymers disclosed herein are taught in U.S. Provisional Application No. 60/718,186, filed Sep. 16, 2005, which is incorporated by reference herein in its entirety. Such TPV compositions could be used in embodiments of the invention to make microcellular TPV foams.

The ingredients of the foams, i.e., the ethylene/α-olefin interpolymer, the blowing agent, the optional second polymer component (e.g., EVA, polyethylene, and polypropylene) and additives (e.g., the cross-linking agent) can be mixed or blended using methods known to a person of ordinary skill in the art. Non-limiting examples of suitable blending methods include melt blending, solvent blending, extruding, and the like.

In some embodiments, the ingredients of the foams are melt blended by a method as described by Guerin et al. in U.S. Pat. No. 4,152,189. First, all solvents, if there are any, are removed from the ingredients by heating to an appropriate elevated temperature of about 100° C. to about 200° C. or about 150° C. to about 175° C. at a pressure of about 5 torr (667 Pa) to about 10 torr (1333 Pa). Next, the ingredients are weighed into a vessel in the desired proportions and the foam is formed by heating the contents of the vessel to a molten state while stirring.

In other embodiments, the ingredients of the foams are processed using solvent blending. First, the ingredients of the desired foam are dissolved in a suitable solvent and the mixture is then mixed or blended. Next, the solvent is removed to provide the foam.

In further embodiments, physical blending devices that can provide dispersive mixing, distributive mixing, or a combination of dispersive and distributive mixing can be used in preparing homogenous blends. Both batch and continuous methods of physical blending can be used. Non-limiting examples of batch methods include those methods using BRABENDER® mixing equipments (e.g., BRABENDER PREP CENTER®, available from C. W. Brabender Instruments, Inc., South Hackensack, N.J.) or BANBURY® internal mixing and roll milling (available from Farrel Company, Ansonia, Conn.) equipment. Non-limiting examples of continuous methods include single screw extruding, twin screw extruding, disk extruding, reciprocating single screw extruding, and pin barrel single screw extruding. In some embodiments, the additives can be added into an extruder through a feed hopper or feed throat during the extrusion of the ethylene/α-olefin interpolymer, the optional second polymer component or the foam. The mixing or blending of polymers by extrusion has been described in C. Rauwendaal, *"Polymer Extrusion"*, Hanser Publishers, New York, N.Y., pages 322-334 (1986), which is incorporated herein by reference.

As used herein, "preparing the foam layer" further includes the steps of cleaning the surfaces of the prepared foams with solvents or water and then oven drying to remove the solvents or water. Suitable solvents in this regard include, but are not limited to, non-aromatic and non-chlorinated solvents, including heptane, methyl cyclohexane (MCH), ethyl cyclohexane, methyl ethyl ketone (MEK), ethyl acetate (EA), butyl acetate (BA), and any combination of two or more thereof. Oven drying to remove solvents or water may be performed by methods known to those of ordinary skill in the art. For example, oven drying may be conducted at 60° C. in a FREAS 625 mechanical convection oven for 3 minutes or in an Infra-red heating tunnel at 55° C. for roughly 3 minutes.

Application of Primer

In certain embodiments, the process of the present disclosure includes the step of ii) applying a primer to the foam layer. Suitable primers include, but are not limited, to the UV primers disclosed in WO 2016/004618 A1 and WO 2016/004898 A1.

In one embodiment, component A) of the primer disclosed herein comprises 1,6-hexanediol diacrylate (HDDA). In another embodiment, component A) of the primer disclosed herein comprises tripropylene glycol diacrylate (TPGDA). In another embodiment, component B) of the primer disclosed herein comprises a chlorine content of from 15 to 40 wt % based on the weight of component B). In a further embodiment, component C) of the primer disclosed herein is selected from the group consisting of the following: styrene-ethylene/butylene-styrene block copolymer (SEBS), styrene/butadiene/styrene block copolymer (SBS), and maleic anhydride grafted styrene-ethylene/butylene-styrene block copolymer (MAH-g-SEBS).

Methods of applying the primer may include any known to a person of ordinary skill in the art. For example, in an embodiment, the primer is applied via degrease cotton. In an embodiment, the degrease cotton is controlled by tweezers and is immersed into primer; the degrease cotton with primer is then taken out and coated onto the surface of foam. In another embodiment, the primer can be applied by cotton gauze or brushes by immersing them into primers and then taking the gauze/brush with primer out and coating them onto the surface of foam.

As used herein, "applying primer to the foam layer" also includes the step of oven drying to remove solvents or water following application of the primer to the foam layer.

Ultraviolet Irradiation

In certain embodiments, the process of the present disclosure includes the step of iii) irradiating the foam layer with an ultraviolet energy of greater than 0.7 $J/cm^2$. Such a step serves to activate the UV primers applied to the foam layers disclosed herein. In certain embodiments, the foam layer may be irradiated with a UV curing machine that is equipped with one or several mercury lamps. The UV curing machine may be a UV curing chamber (batch production) or a conveying belt UV curing machine (continuous production).

Generally, "high UV energy" (i.e., greater than 0.7 $J/cm^2$) is not preferred or accepted by the footwear industry for traditional EVA or POE foams, since high UV energy leads to high surface temperatures. For traditional EVA or POE foams, the high surface temperatures cause foam shrinkage, foam warpage due to the temperature difference between the irradiated and non-irradiated surfaces, and post-foaming of the residual blowing agent in the foam samples. Such "high UV energy" (i.e., greater than 0.7 J/cm$^2$) is the high UV energy described in the Examples in connection with Table 3 below.

The present inventors surprisingly and unexpectedly found that, through the novel process of the present disclosure, the combination of the UV primers disclosed herein with high UV energy (i.e., greater than 0.7 J/cm$^2$) improves the bonding performance (i.e., achieves a peel strength of over 3 N/mm) of a high content foam layer (i.e., greater than 50 weight percent of a high density OBC), where the foam layer maintains its original shape/dimension without shrinkage or warpage. Without being bound to any theory, it is believed that the foam maintains its original shape/dimension without shrinkage or warpage due to the high melting point of the hard segment of the OBC.

"Warpage," as used herein, refers to any distortion of a foamed article relative to its original shape, including bends or twists.

Application of Adhesive Layer

In certain embodiments, the process of the present disclosure includes the step of iv) applying the adhesive layer to the foam layer. In certain embodiments, the adhesive layer can be a polar substrate. In further embodiments, the adhesive layer may be a polyurethane adhesive. In further embodiments, the adhesive layer may be any polar substrate known to a person of ordinary skill in the art.

The adhesive layer may be applied to the foam layer via any method known to one of ordinary skill in the art. In certain embodiments, the adhesive layer is applied to the foam layer by wool or nylon brush, and then oven drying to remove the water or solvent. "Applying the adhesive to the foam layer" further includes attaching two adhesive coated layers together to achieve the bonding by using compression at, for example, 3 kgf/cm$^2$ for around 45 seconds.

Optional Reinforcing Primer

As an optional step, a reinforcing treatment layer can be applied following UV irradiation of the foam layer (i.e., before application of the adhesive layer to the primer treated foam layer), followed by another oven drying process.

Reinforcing primer is usually used to improve the initial peel strength. In most cases, the reinforcing primer has similar chemical ingredients with the corresponding adhesive layer. These primers have similar solid level but different viscosity. Specifically, the reinforcing primer usually has lower viscosity than the adhesive layer, The reinforcing primer is particularly useful when the substrate has a rough surface which is difficult to form a flat adhesive layer when the high viscosity adhesive is directly applied on the surface. Due to its low viscosity, the reinforcing primer can easily penetrate into the UV primer layer to favor the interlock with UV primer. At the same time, the reinforcing primer can easily form a flat layer due to its lower viscosity and thus has a good interaction with the final PU adhesive layer. Generally the reinforcing primer is useful to further strengthen the interaction between the UV primer and the PU adhesive layers.

EXAMPLES

Test Methodologies

Polymer density was measured in accordance with ASTM D-792.

Melt index (I2) of an ethylene-based polymer is measured in accordance with ASTM D-1238, condition 190° C./2.16 kg. Melt index (I10) of an ethylene-based polymer is measured in accordance with ASTM D-1238, condition 190° C./10.0 kg.

Differential Scanning calorimetry (DSC) is used to measure crystallinity in ethylene-based (PE) samples and propylene-based (PP) samples. About 5 to 8 mg of film sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)×100 (for PE)).

Unless otherwise stated, melting point(s) ($T_m$) of each polymer is determined from the second heat curve, and the crystallization temperature ($T_c$) is determined from the first cooling curve.

Gel Permeation Chromatography: The chromatographic system consisted of either a Polymer Laboratories Model PL-210 or a Polymer Laboratories Model PL-220. The column and carousel compartments were operated at 140° C. The columns were three Polymer Laboratories, 10-micron Mixed-B columns. The solvent used was 1,2,4 trichlorobenzene. The samples were prepared at a concentration of "0.1 gram of polymer in 50 milliliters of solvent." The solvent used to prepare the samples contained "200 ppm of butylated hydroxytoluene (BHT)." Samples were prepared by agitating lightly for two hours at 160° C. The injection volume was 100 microliters, and the flow rate was 1.0 milliliters/minute. Calibration of the GPC column set was performed with 21 "narrow molecular weight distribution polystyrene standards," with molecular weights ranging from 580 to 8,400,000, arranged in six "cocktail" mixtures, with at least a decade of separation between individual molecular weights. The standards were purchased from Polymer Laboratories (Shropshire, UK). The polystyrene standards were prepared at "0.025 grams in 50 milliliters of solvent" for molecular weights equal to, or greater than, 1,000 kg/mol, and "0.05 grams in 50 milliliters of solvent" for molecular weights less than 1,000 kg/mol. The polystyrene standards were dissolved at 80 degrees Celsius, with gentle agitation, for 30 minutes. The narrow standards mixtures were run first, and in order of decreasing "highest molecular weight" component to minimize degradation. The polystyrene standard peak molecular weights were converted to polyethylene molecular weights using the following equation: $M_{polyethylene}=A\times(M_{polystyrene})^B$, where M is the molecular weight, A has a value of 0.431 and B is equal to 1.0 (as described in Williams and Ward, *J. Polym. Sc., Polym. Let.*, 6, 621 (1968)). Polyethylene equivalent molecular weight calculations were performed using Viscotek TriSEC software Version 3.0.

$^{13}$C NMR Analysis: The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989).

Shore A Hardness: Shore A hardness was measured according to ASTM D2240A with both sides skin on. An average of five readings (5 seconds latency measured across the surface of each sample) was reported.

Foam Density: Foam density was measured according to ASTM D3575, Test Method A, by calculation from the mass and volume of a regularly shaped specimen. Bun foams were weighed to the nearest 0.1 g, and volume was determined by measuring length, width, and thickness to the nearest 0.01 cm with both sides skin on.

Falling Ball Rebound: A ⅝" diameter steel ball was dropped from a height of 500 mm onto the bun foam skin layers to determine the % Rebound or Resilience. The % Rebound is calculated as rebound height (in mm)*100/500.

Mechanical Properties: Bun foam with single side skin on were submitted for ASTM D638 (Tensile, Type 4) and ASTM D624 (Tear, Type C) mechanical property tests at 20 inches/minute. The sample thickness was approximately 3 mm. The split tear strength was measured by using a specimen with the dimension of 6" (length)*1" (width)*0.4" (thickness) and the notch depth of 1-1.5" at the testing speed of 2 inches/minute.

Compression Set: Compression Set (C-Set) was measured per ASTM D395, Method B, under conditions of 50% compression at 50° C. for 6 hours with single side skin on. Two buttons were tested per sample foam, and the average was reported. The compression set was calculated by using the following equation, where $T_0$ is the interval distance of the apparatus, $T_1$ is the sample thickness before test and $T_2$ is the sample thickness after test:

$$\text{Compression set} = \frac{T1 - T2}{T1 - T0} * 100\%$$

UV irradiation shrinkage: the rectangular specimens with single side skin on were put into the UV curing chamber for high or normal UV energy irradiation in the examples relating to Table 3. The linear shrinkage percentage was calculated according to specimen length measured before and after UV irradiation.

Oven Shrinkage: After skin layers (top and bottom) were removed from the bun foams, samples were cut using a vertical band saw, measured for mass and thickness, placed in a pre-heated oven at 100° C., and removed from the oven after 40 minutes. Sample dimensions were then re-measured after 24 hours of cooling at room temperature.

Peel Strength: The foam slabs were first cut into 15 cm (L)*2.5 cm (W)*0.5 cm (T) for peel strength testing. The peel (bond) strength (N/mm) was measured according to ASTM D1876 by using a 180° peel test with a crosshead speed of 100 mm/min (rather than 254 mm/min as indicated in D1876). The average peel (bond) strength was recorded as an average value of different positions selected by every 10 mm. The maximum peel strength was measured by selecting the maximum load divided by the sample width.

Raw Materials

The following materials were used in preparing the examples:

EVA 7360M: ethylene-vinyl acetate copolymer, density 0.941 g/cm$^3$ (ASTM D792), MI 2.5 g/10 min (ASTM D1238, at 190° C./2.16 kg), Shore A=86 (ASTM D2240), 21 wt % vinyl acetate content (commercially available from *Formosa* Plastics Corporation (Mailiao Village, Taiwan)).

ENGAGE™ 8450: ethylene-octene copolymer, density 0.902 g/cm$^3$ (ASTM D792), MI 3 g/10 min (ASTM D1238, at 190° C./2.16 kg), Shore A=90 (ASTM D2240) (commercially available from The Dow Chemical Company).

ENGAGE™ 8452: ethylene-octene copolymer, density 0.875 g/cm$^3$ (ASTM D792), MI 3 g/10 min (ASTM D1238, at 190° C./2.16 kg), Shore A=74 (ASTM D2240) (commercially available from The Dow Chemical Company).

INFUSE™ 9530: olefin block copolymer, density 0.887 g/cm$^3$ (ASTM D792), MI 5 g/10 min (ASTM D1238, at 190° C./2.16 kg), Shore A=83 (ASTM D2240) (commercially available from The Dow Chemical Company).

LUPEROX® DC40P: dicumyl peroxide from Arkema with active peroxide content around 40 wt % (commercially available from Arkema Inc.).

LUPEROX® DC40P-SP2: Scorch protected dicumyl peroxide from Arkema with active peroxide content around 40 wt % (commercially available from Arkema Inc.).

AC9000: Azodicabonamide type blowing agent (commercially available from Kum Yang (Korea) company).

ZnO: Zinc oxide, local grade.

ZnSt: Zinc stearate, local grade.

ATOMITE™ Calcium carbonate (commercially available from Imerys Pigments (Roswell, Ga., USA)).

HARDLEN® F-2P: Maleic anhydride grafted chlorinated polyolefin (CPO) from Toyobo (Japan), with 20 wt % of chlorine content, 1.6 wt % of maleic anhydride (MAH) content, and weight average molecular weight (Mw) of 75,000 (commercially available from Toyobo Co., LTD).

DOUBLEMER® HDDA: 1,6-Hexanediol dimethacrylate (HDDA) (commercially available from Double Bond Chemical (Taiwan) Co., LTD).

DOUBLEMER® TPGDA: Tripropylene Glycol Diacrylate (commercially available from Double Bond Chemical (Taiwan) Co., LTD).

DOUBLECURE® 184: Photo initiator (commercially available from Double Bond Chemical (Taiwan) Co., LTD).

Kraton® SEBS G1652: SEBS polymers with 30 wt % of styrene content and a melt index of 5 measured at 230° C. with a load of 5 kg (commercially available from Kraton).

MCH: Methyl cyclohexane obtained from Wokai Reagent Company.

MEK: Methyl ethyl ketone obtained from Sino-reagent Company.

Waterborne Polyurethane Adhesives include adhesives which are commercially available: under the names 6602, 6608, and GE-01 from Great Eastern Resins Industrial Co. Ltd. (Taiwan); under the names NP-57 and NP-580 from Nan Pao Resins Chemical Co. Ltd. (Taiwan); and WU-602L and WU-606 from Iao Son Hong Tinta E Vernizes Lda./Zhong Bu (Centresin) Adhesive & Chemical Co., Ltd. (Macau).

Preparation of Sample Foam Layers

Approximate conditions, properties, formulations, etc. for the preparation of the examples of the present disclosure are provided below.

Polymer components were compounded in accordance with the formulations (in weight percentages) shown in Table 1 via the following compound preparation procedure.

Polymer pellets were added to a 1.5 liter Banbury mixer. Then, ZnO, ZnSt and CaCO₃ were added after the polymer had melted (around 5 minutes). The blowing agent and peroxide were added last after the fillers were uniformly dispersed, and the contents mixed for another 3 to 5 minutes for a total mixing time of 15 minutes. The batch temperature was checked by using a thermo probe detector right after the compounds were discharged. The compounds' actual temperature is generally 10 to 15° C. higher than the displayed temperature on the equipment (compound temperature was around 100° C.). Hence, during the compounding process, the displayed equipment temperature was lowered to ensure the compound temperature did not exceed the curing agent and blowing agent decomposition temperatures. The compounded formulations were placed between two roll mills (maintained at a temperature of about 100° C.), and the compounded formulations were formed into sheets (or roll milled blankets) of about 5 mm in thickness.

TABLE 1

|  | 100% POE Formulation | 100% EVA Formulation | 50% OBC Formulation | 70% OBC Formulation | 100% OBC Formulation |
|---|---|---|---|---|---|
| ENGAGE™ 8450 | 45 | | | | |
| EVA 7360M | | 100 | 50 | 30 | |
| ENGAGE™ 8452 | 55 | | | | |
| INFUSE™ 9530 | | | 50 | 70 | 100 |
| LUPEROX® DC40P | 1.5 | 1.8 | 1.8 | 1.8 | 1.8 |
| LUPEROX® DC40P-SP2 | 1 | 1.2 | 1.2 | 1.2 | 1.2 |
| AC9000 | 3 | 3 | 2.7 | 2.5 | 2.5 |
| ZnO | 0.3 | 0.3 | 0.27 | 0.25 | 0.25 |
| ZnSt | 0.3 | 0.3 | 0.27 | 0.25 | 0.25 |
| ATOMITE™ | 5 | 5 | 5 | 5 | 5 |

The resulting compounds were then converted into bun foams in accordance with the following bun foaming procedure.

Roll milled blankets were cut into squares (three or four "6 inch×6 inch") and placed inside a pre-heated bun foam mold of dimensions around 49 square inches. The surface of the chase was sprayed with mold releasing agent to avoid sticking of the foam to the chase during de-molding. Two compression molding processes were involved: preheating first to eliminate air pockets inside the sample and between the stacked blanket layers prior to curing, and then curing/foaming. Preheating was conducted for 8 minutes at 110° C. (for low melting polymers like EVA or ENGAGE™) or 120° C. (for high melting polymer like INFUSE™), and the mold was pressed at 10 tons for 4 minutes to form a solid mass in the mold before foaming. The preheated mass was transferred to the foaming press and held for 8 minutes at 100 kg/cm² and 180° C. Once the pressure was released, the bun foam was removed quickly from the tray and placed in a vent hood on several non-stick sheets, and the top side length was measured as soon as possible. The foam surfaces needed to be insulated from the bench top using, e.g., cardboard boxes. Insulating the surfaces of the newly made bun foam prevented uneven cooling on the top and bottom surfaces. The foams cool in the hood for 40 minutes then they are transferred to a storage container and allowed to cool for 24 hours. Foam properties of the sample bun foams are shown in Table 2.

TABLE 2

|  | 100% POE Formulation | 100% EVA Formulation | 50% OBC Formulation | 70% OBC Formulation | 100% OBC Formulation |
|---|---|---|---|---|---|
| Expansion Ratio | 1.64 | 1.61 | 1.61 | 1.62 | 1.63 |
| Skin Density, g/cc | 0.166 | 0.200 | 0.187 | 0.179 | 0.167 |
| Shore A | 40.0 | 47.4 | 45.1 | 43.2 | 40 |
| Resiliency, % | 54.6 | 54.2 | 59.2 | 61.4 | 62.2 |
| C-set 50° C., % | 52.3 | 48.7 | 40.7 | 38 | 36.7 |
| Shrink. 100° C., 40 min, % | 9.7 | 12.6 | 11.5 | 3.2 | 1.4 |
| Tear, N/mm | 12.2 | 13.86 | 13.2 | 11.5 | 12.35 |
| Tensile Strength, MPa | 2.54 | 3.37 | 2.61 | 2.2 | 2.05 |

TABLE 2-continued

|  | 100% POE Formulation | 100% EVA Formulation | 50% OBC Formulation | 70% OBC Formulation | 100% OBC Formulation |
|---|---|---|---|---|---|
| Tensile Elongation, % | 317 | 350 | 260 | 250 | 354 |
| Split tear, N/mm | 3.09 | 2.66 | 2.3 | 2.53 | 2.99 |

Preparation of UV Primer

For bonding the sample bun foam layers, UV primers were prepared in accordance with the disclosures of WO 2016/004618 A1. More specifically, Primers A-C used in the examples of the present disclosure were prepared as follows.

To make the formulations for Primers A-C, several pre-solutions were first prepared including:
a. 5% MAH-g-CPO in methyl cyclohexane (MCH) by heating reflux the solution in three neck flask at 80° C. for 30 mins with mechanical stirring;
b. 10% SEBS 1652 in MCH by heating reflux the solution in three neck flask at 80° C. for 30 mins with mechanical stirring;
c. 10% photo initiator 184 directly dissolved in methyl-ethyl-ketone (MEK) at room temperature;
d. 10% HDDA dissolved in a solvent mixture of MEK/MCH (1/1); and
e. 10% TPGDA dissolved in a solvent mixture of MEK/MCH (1/1).

Primer A is composed of the primer composition as follows: HDDA/TPGDA/F2P/SEBS/184 (40/40/20//30/6.4) dissolved in MCH/MEK solvent mixture (solid level around 2.5%).

Primer B is composed of the primer composition as follows: HDDA/TPGDA/F2P/SEBS/184 (30/30/40//10/4.8) dissolved in MCH/MEK solvent mixture (solid level around 2.5%).

Primer C is composed of the primer composition as follows: HDDA/TPGDA/F2P/SEBS/184 (30/30/40//20/4.8) dissolved in MCH/MEK solvent mixture (solid level around 2.5%).

Bonding of Sample Foam Layers

The olefin-based polymer foam slabs were cut into "15 cm (L)*2.5 cm (W)*0.5 cm (T)" test substrate foams for the bonding test (T-Peel).

Figure 3:
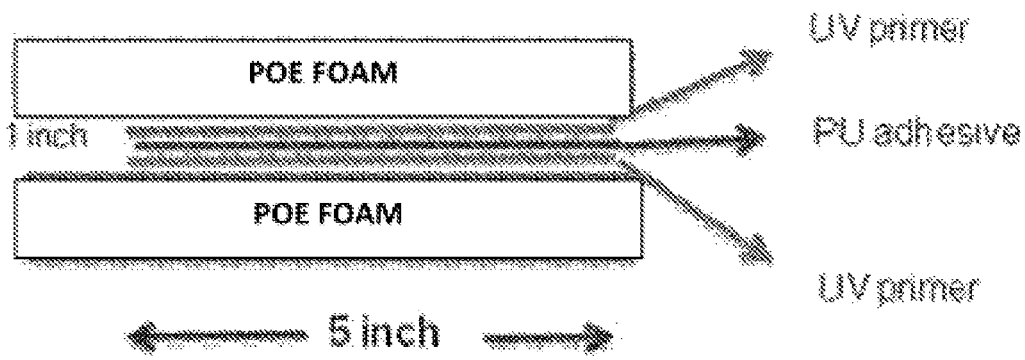
FIG. 3 illustrates a cross-section schematic of sample T-peel adhesion tests.

The test sample for the T-Peel adhesion test is shown in FIG. 3 (cross-section schematic). The test sample preparation is outlined in FIG. 1.

Each primer composition (about a coating weight of 5-10 g solid per one square meter of one substrate) was applied onto the skin side of two test substrate foams, and the primed foams were thermally treated to remove solvent (see FIG. 1).

Irradiation with UV energy for each of the 100% POE, 100% EVA, 50% OBC, 70% OBC, and 100% OBC foam formulations was conducted using an INTELLI-RAY 400 FLOOD UV curing chamber equipped with a mercury lamp (see FIG. 2). For normal energy UV irradiation, samples were placed on a lower position (Level 3) for 60 seconds. For high energy UV irradiation, samples were put on a higher position (Level 2) for 60 seconds. Results of the sample foamed articles irradiated via a UV curing chamber are seen in Table 3.

UV irradiation for the 100% POE and 100% OBC foam formulations was also conducted using a YX-UV-202 conveying belt curing machine (containing a high pressure mercury lamp (2 kW*2)) available from Dongguan WeiSen Instrument Ltd. A UV curing machine was used to measure the exact UV energy applied on the foam samples. Results of the sample foamed articles irradiated via a conveying belt curing machine are seen in Table 4.

Then a two-component, waterborne polyurethane (PU) adhesive was applied on each primed olefin-based foam skin. The PU was applied onto the primed surface. Finally the two PU coated foam skin were adhered together in the oven and then further subjected to be pressed at 3 kgf/cm² for 45 seconds. The PU adhesive on both sides of the foam skin surface reacted to form a "PU adhesive layer" located between the two olefin-based foam substrates. The resulted bonded test sample was as follows: a sandwich structure POE foam/Primer/PU Adhesive/Primer/POE foam. A "1 inch" portion of the test sample was un-adhered, in order to easily separate the two POE foam for insertion into the clamps of the T-Peel test Instron. The adhered portion of the test sample was around "5 inch" in length and around "1 inch (2.5 cm)" in width. The test sample provided a good representation of the bonded foams in a footwear component.

The T-peel test was conducted in an INSTRON 5566. The un-adhered ends of the bonded sample were clamped in the top and bottom clamps, respectively, of the Instron. The initial clamp distance was 1 inch. The bonded sample was peeled at a crosshead speed of 100 mm/min. The Peel force was recorded and average peel force was calculated. Peel strength (N/mm) was calculated as follows: average peel force (N)/sample width (mm).

TABLE 3

|  | Foam Formulation | Primer | UV Energy (chamber) | Sample Warpage | Peel Strength (N/mm) | Shrinkage | Acceptable (Yes/No) |
|---|---|---|---|---|---|---|---|
| Comparative Ex. A | 100% POE | C | High | Yes | N/A (warped) | ~0.5% | No |
| Comparative Ex. B | 100% EVA | C | High | Yes | N/A (warped) | ~0.8% | No |
| Comparative Ex. C | 100% OBC | C | Normal | No | 2.3 | No | No |
| Comparative Ex. D | 50% OBC | C | High | Yes | N/A (warped) | ~0.8 | No |
| Example 1 | 70% OBC | C | High | No | 3.3 | No | Yes |
| Example 2 | 100% OBC | C | High | No | 3.7 | No | Yes |

As seen in Table 3, the novel process of the present disclosure unexpectedly demonstrates that a high content polyolefin foam formulation (i.e., greater than 50 weight percent of a high density OBC) can achieve a peel strength of over 3 N/mm without sample warpage or shrinkage due to the combination of the UV primer and high UV energy. In contrast, the 100% POE and 100% EVA formulations, which are representative of the traditional foam formulations in the state of the art, high UV energy caused sample warpage, thereby rendering these foamed articles as not acceptable. Furthermore, it was shown that a high content OBC foam formulation could not achieve the target peel strength of over 3 N/mm when exposed to only low UV energy.

Figure 4:
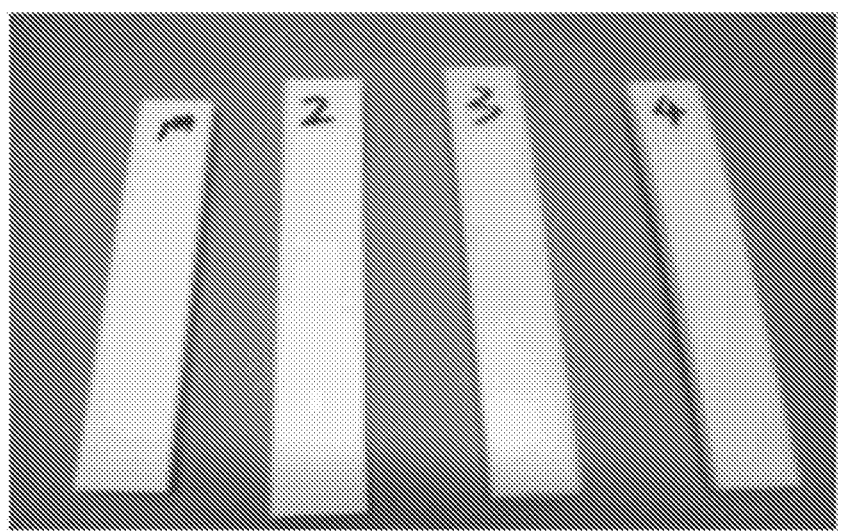
FIG. 4 exhibits sample foamed articles prior to irradiation with UV energy.
Figure 5:
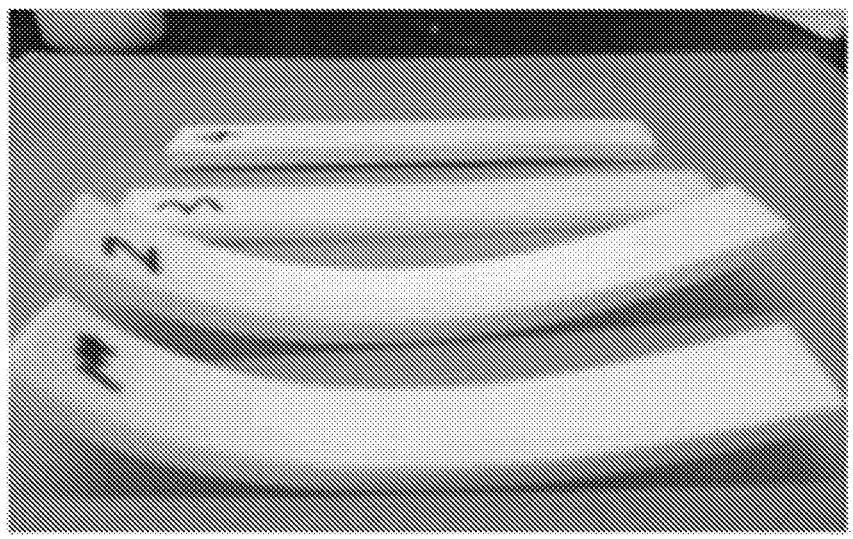
FIG. 5 exhibits sample foamed articles after irradiation with UV energy.

The results of Table 3 are further portrayed in FIGS. 4 and 5. Samples 1, 2, 3, and 4 as shown in FIG. 4 correspond to Comparative Ex. A, Comparative Ex. B, Example 1, and Example 2, respectively, before irradiation. FIG. 5 shows these sample foamed articles after irradiation. As seen in FIG. 5, Comparative Examples A and B were greatly warped after irradiation with high UV energy. In contrast, Examples 1 and 2 remained flat and kept their original shapes.

TABLE 4

| Foam Formulation | Primer | UV Energy, J/cm² (conveying belt) | Sample Warp | Peel Strength, N/mm |
|---|---|---|---|---|
| Comparative Ex. E | 100% POE | B | 0.8 | Yes | N/A (warped) |
| Example 3 | 100% OBC | A | 0.8 | No | 3.1 |
| Example 4 | 100% OBC | A | 1.2 | No | 5.2 |
| Example 5 | 100% OBC | B | 0.8 | No | 4 |
| Example 6 | 100% OBC | B | 1.2 | No | 4.5 |
| Example 7 | 100% OBC | C | 0.7 | No | 3.75 |
| Example 8 | 100% OBC | C | 1.0 | No | 4.75 |

As seen in Table 4, it is clear that the 100% OBC foam formulation has a clear advantage over the 100% POE foam formulation in surviving at even higher UV energy without warpage or deformation of the foam. In addition, it is evident that the peel strength of the foam is increased with increased UV irradiation energy.

Accordingly, as seen in the examples, the novel process of the present disclosure, with the use of UV primer combined with high UV energy, surprisingly improves the bonding performance of high content polyolefin (e.g., OBC) foams without warping or deforming the foams.

What is claimed is:

1. A process for preparing a foamed article comprising an adhesive layer bonded to at least one foam layer, said process comprising the steps of:
    a) preparing the foam layer;
    b) applying a primer to the foam layer;
    c) irradiating the foam layer with an ultraviolet energy of greater than 0.7 J/cm²; and
    d) applying the adhesive layer to the foam layer,
    wherein the foam layer comprises greater than 50 weight percent of an ethylene/α-olefin interpolymer, and
    wherein the primer comprises:
    A) one or more monomers and/or oligomers selected from the group consisting of

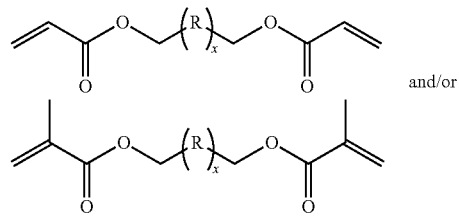

and/or wherein each R is independently selected from the group consisting of the following: substituted or unsubstituted hydrocarbylenes, and substituted or unsubstituted hetero-hydrocarbylenes, each of the hydrocarbylenes and hetero-hydrocarbylenes having between 4 and 40 carbon atoms and x is any integer equal to or greater than 1;
    B) at least one chlorinated olefin-based polymer and/or at least one functionalized chlorinated olefin-based polymer;
    C) at least one styrene-based block copolymer or derivative thereof; and
    D) at least one photoinitiator, and
    wherein the ethylene/α-olefin interpolymer is an olefin block copolymer.

2. The process of claim 1, wherein the ethylene/α-olefin interpolymer has a density of greater than 0.870 g/cm³.

3. The process of claim 1, wherein the foam layer further comprises a peroxide, a blowing agent, and calcium carbonate.

4. The process of claim 1, wherein the adhesive layer is polyurethane.

5. The process of claim 1, wherein the primer further comprises E) one or more non-aromatic and nonchlorinated organic solvents.

6. A foamed article prepared according to the process of claim 1.

7. The foamed article of claim 6, comprising a peel strength between two bonded foam layers of greater than 0.3 N/mm.

8. The foamed article of claim 7, wherein the foamed article is not warped.

9. A foamed article prepared according to the process of claim 1, wherein the foamed article is a footwear article.

* * * * *